(12) United States Patent
Takamisawa et al.

(10) Patent No.: US 7,192,341 B2
(45) Date of Patent: Mar. 20, 2007

(54) VIBRATING CONVEYOR AND COIN PROCESSOR DEVICE

(75) Inventors: Kaihei Takamisawa, Tokyo (JP); Katsuyuki Hinata, Tokyo (JP)

(73) Assignee: Takamisawa Cybernetics Co., Ltd., Tokyo (JP)

( * ) Notice: Subject to any disclaimer, the term of this patent is extended or adjusted under 35 U.S.C. 154(b) by 227 days.

(21) Appl. No.: 10/704,060

(22) Filed: Nov. 7, 2003

(65) Prior Publication Data

US 2004/0116063 A1    Jun. 17, 2004

(30) Foreign Application Priority Data

Nov. 11, 2002    (JP)    .............................. 2002-327351

(51) Int. Cl.
   *G07D 1/00*    (2006.01)
(52) U.S. Cl. ........................... 453/63; 453/18; 453/55; 221/200
(58) Field of Classification Search ................. 453/63, 453/18, 30, 55; 194/342, 343, 344; 198/512, 198/533, 752.1, 759, 771; 221/17, 201, 202, 221/203, 204, 200; 414/306
   See application file for complete search history.

(56) References Cited

U.S. PATENT DOCUMENTS

| | | | |
|---|---|---|---|
| 3,752,168 A | | 8/1973 | Bayha |
| 3,998,237 A | * | 12/1976 | Kressin et al. .................. 453/6 |
| 4,230,135 A | * | 10/1980 | Ueda ............................ 453/11 |
| 4,247,019 A | * | 1/1981 | Lerner .......................... 222/56 |
| 4,383,540 A | * | 5/1983 | De Meyer et al. ............... 453/3 |
| 4,469,592 A | * | 9/1984 | Krause et al. ............... 209/322 |
| 4,741,443 A | * | 5/1988 | Hanrot et al. .............. 209/44.1 |
| 5,531,640 A | * | 7/1996 | Inoue .......................... 453/17 |
| 5,620,079 A | * | 4/1997 | Molbak ....................... 194/217 |
| 5,713,457 A | * | 2/1998 | Musschoot .................. 198/753 |
| 6,017,270 A | | 1/2000 | Ristvedt et al. |

FOREIGN PATENT DOCUMENTS

| | | |
|---|---|---|
| GB | 2106296 A | 4/1983 |
| WO | WO 97/07485 | 2/1997 |

OTHER PUBLICATIONS

Japanese publication No. 08-110960, publication date Apr. 30, 1996 (and associated English language abstract).
Japanese Utility Model Publication No. 8-9804, published on Mar. 21, 1996 (and associated machine translation from Japanese Patent Office website).

* cited by examiner

*Primary Examiner*—Patrick Mackey
*Assistant Examiner*—Mark J. Beauchaine
(74) *Attorney, Agent, or Firm*—Morgan & Finnegan LLP

(57) ABSTRACT

A vibrating conveyor 1 for conveying coins using vibration, comprising: a conveyor plate 11 to be loaded with coins to convey the coins loaded thereon by relatively moving the coins; vibration generator means 20 for vibrating the conveyor plate 11; or the vibrating conveyor 1 further comprising a coin storage section 13 disposed around the conveyor plate 11 for storing the coins to be conveyed in conjunction with the conveyor plate 11, wherein the boundary between the conveyor plate 11 and the coin storage section 13 is formed in a wave shape of a specified period. The vibrating conveyor can handle a large amount of coins with a simple design.

33 Claims, 7 Drawing Sheets

Fig.1
(a)
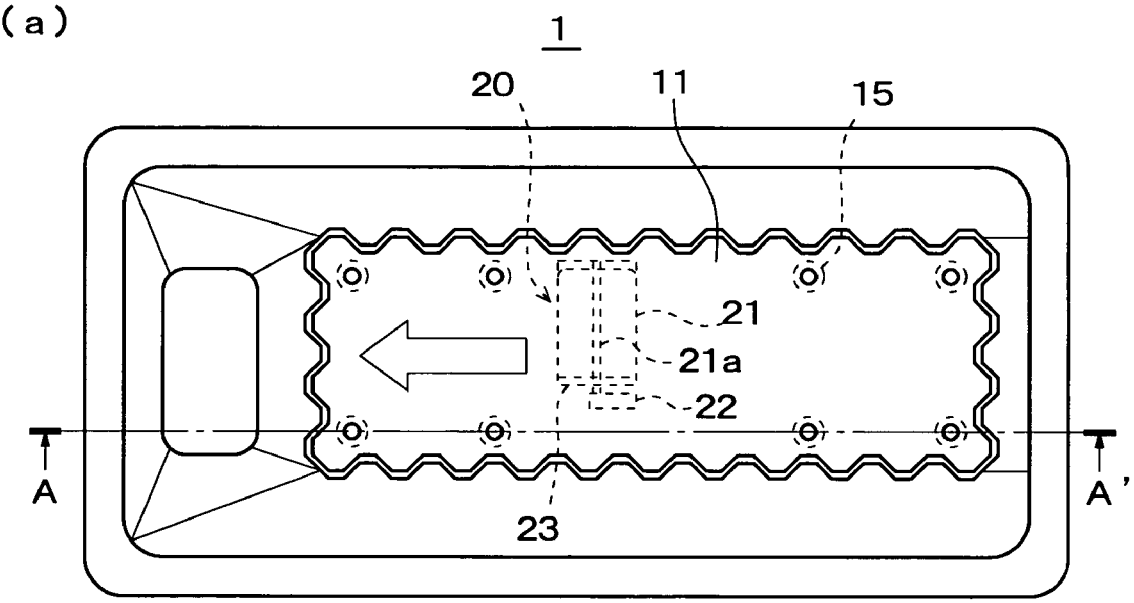
(b)
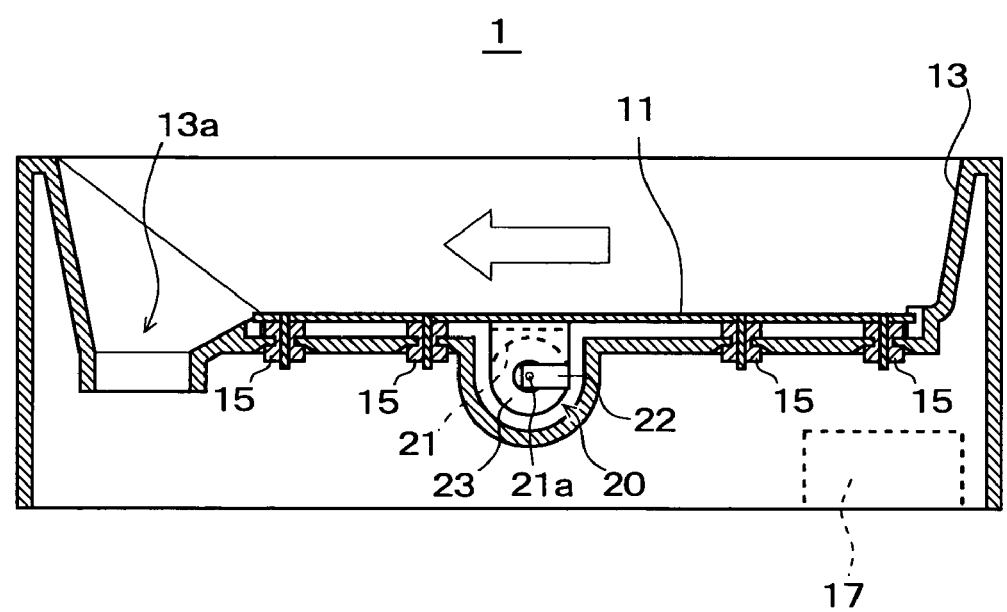

Fig.2
(a)
(b)

VIBRATING CONVEYOR AND COIN PROCESSOR DEVICE

BACKGROUND OF THE INVENTION

1. Field of the Invention

This invention relates to a vibrating conveyor for conveying coins and a coin processor device provided with the vibrating conveyor and, more particularly, to a vibrating conveyor and a coin processor device with a simple design for handling large amounts of coins.

2. Description of the Related Art

The conventional coin conveyor is for example utilized in coin processors such as coin storing and dispensing machines and coin discriminators. One such coin conveyor conveys coins loaded on a belt stretched between multiple rotating pulleys by rotatably driving the belt. In another type of coin conveyor, coins are conveyed by the belt in the necessary amounts by utilizing a device to separate the coins into one coin at a time and supply the individual coins to an external device (See Patent Document 1, for example).

Patent Document: JP-A-2000-242844 (pp. 4–5, FIGS. 1–4).

It is, however, difficult for the above coin conveyors to convey a large amount of coins at a time. Also, the above devices need driving means such as rotating pulleys and thus are complicated in structure.

SUMMARY OF THE INVENTION

It is, therefore, an object of the present invention to provide a vibrating conveyor and a coin processor device with a simple design for handling large amounts of coins.

For the purpose of accomplishing the above object, the vibrating conveyor 1 of the invention is a vibrating conveyor for conveying coins using vibration, comprising: a conveyor plate 11 to be loaded with coins and conveying the coins loaded thereon by relatively moving the coins; and a vibration generator means 20 for vibrating the conveyor plate as shown in FIG. 1, for example. A vibration generator means may comprise a mass member and a reciprocating member reciprocatively moving said mass member relatively to said conveyor plate 11 for vibrating said conveyor plate 11.

In the vibrating conveyor 1 constituted as described above, the conveyor plate 11 is vibrated by the vibration generator means 20 and conveys coins loaded thereon by relatively moving the coins. Thus, there can be provided a vibrating conveyor 1 with a simple design for handling large amounts of coins.

The vibrating conveyor 1 may further comprise a coin storage section 13 disposed around the conveyor plate 11 for storing the coins to be conveyed in conjunction with the conveyor plate 11, wherein the boundary between the conveyor plate 11 and the coin storage section 13 is formed in a wave shape of a specified period as shown in FIG. 1 and FIG. 2, for example.

When the vibrating conveyor 1 constituted as described above has the coin storage section 13 for storing coins in conjunction with the conveyor plate 11, the vibrating conveyor 1 can easily stores a large amount of coins, for example. Also, since the boundary between the conveyor plate 11 and the coin storage section 13 is formed in a wave shape with a specified period, coins can be prevented from being caught between the conveyor plate 11 and the coin storage section 13, for example.

The vibrating conveyor 1 may preferably be configured to generate vibration at intervals.

When the vibrating conveyor 1 constituted as described above can generate vibration at intervals, the conveyance of coins by the conveyor plate 11 can be controlled, for example.

In the vibrating conveyor 1, the vibration generator means 20 may have a motor 21 with a rotating shaft $21a$ and an eccentric member 22 attached to the rotating shaft $21a$, and the motor 21 may be fixed to the conveyor plate 11 so that the rotating shaft $21a$ is generally perpendicular to the conveying direction.

When the vibrating conveyor 1 constituted as described above has the vibration generator means 20 having a motor 21 and an eccentric member 22 attached to the rotating shaft $21a$ of the motor 21, and the motor 21 is fixed to the conveyor plate 11 so that the rotating shaft $21a$ is generally perpendicular to the conveying direction, vibration by which the coins loaded on the conveyor plate 11 are conveyed in the conveying direction can be easily generated, for example.

In the vibrating conveyor 1, the conveyor plate 11 may be supported at a plurality of points by a supporting member 15.

In the vibrating conveyor 1 constituted as described above, the conveyor plate 11 is supported at a plurality of points by the supporting member 15. Thus, wherever on the conveyor plate 11 the coins are loaded, the influence of fluctuations in the load is small.

For the purpose of accomplishing the above object, the coin processor device 100 of the invention may comprise the vibrating conveyor 101 described above; and a dispenser section 110 for storing a part of coins to be conveyed and dispensing the stored coins one at a time as shown in FIG. 5, for example.

When the coin processor device 100 constituted as described above comprises the vibrating conveyor 101 and the dispenser section 110, a part of coins conveyed by the vibrating conveyor 101 are supplied to the dispenser section 110 and the coins stored by the dispenser section 110 as a result of the supply are dispensed one at a time. Thus, there can be provided a coin processor device with a simple design for handling large amounts of coins.

For the purpose of accomplishing the above object, the coin processor device 100 of the invention may comprise a coin conveyor device 101 for storing a large amount of coins and sending the large amount of coins at intervals while said coins are conveyed; a dispenser section 110 for storing the coins sent at intervals and dispensing the stored coins one at a time; and a counter section 120 for counting the dispensed coins.

When the coin processor device 100 constituted as described above comprises the coin conveyor device 101, the dispenser section 110 and the counter section 120, the coin processor device 100 sends a large amount of stored coins at intervals while said coins are conveyed, stores the coins sent at intervals, dispenses the stored coins one at a time and counts the dispensed coins. Thus, there can be provided a coin processor device with a simple design for handling a large amount of coins.

For the purpose of accomplishing the above object, the coin processor device 100 of the invention may comprise: a coin sender 101 for storing a large amount of coins and sending the large amount of coins at intervals; a dispenser section 110 for storing the at-intervals-conveyed coins and dispensing the stored coins one at a time; and a counter section 120 for counting the dispensed coins, wherein the coin sender 101 sends the coins at intervals based on the amount of coins stored in the dispenser section 110 as shown in FIG. 5 and FIG. 6, for example.

When the coin processor device 100 constituted as described above comprises a coin sender 101, a dispenser section 110, and a counter section 120, the coin processor device 100 sends a large amount of stored coins at intervals, stores the coins sent at intervals, dispenses the stored coins one at a time and counts the dispensed coins. Thus, there can be provided a coin processor device with a simple design for handling a large amount of coins. Also, since the coin sender 101 is configured to send the coins at intervals based on the amount of coins stored in the dispenser section 110, an appropriate amount of coins can be stored in the dispenser section 110. Thus, the coin processor device 100 can process coins with high efficiency.

BRIEF DESCRIPTION OF THE DRAWINGS

FIG. 1 shows the outline of a vibrating conveyor according to a first embodiment of the present invention, wherein (a) is a plan view of the vibrating conveyor and (b) is a cross-sectional view taken along the line A–A' in (a).

FIG. 2 illustrates the shape of the boundary between a conveyor plate and a tray according to the first embodiment of the present invention, wherein (a) is a schematic view illustrating the case where the boundary consists of zigzag lines and (b) is a schematic view illustrating the case where the boundary consists of curves.

Figure 3:
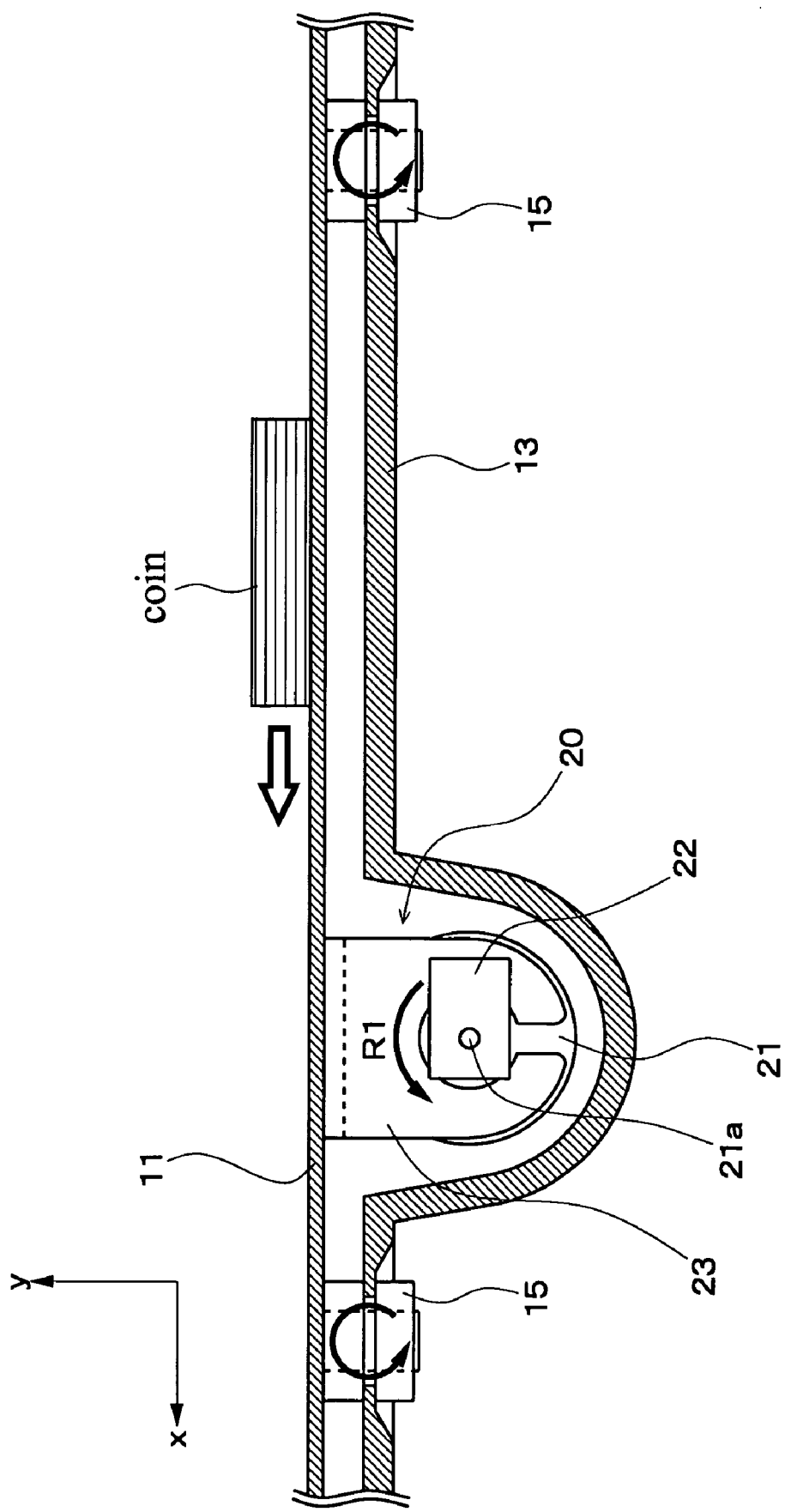
FIG. 3 is an enlarged schematic cross-sectional view of a vibrating part of the vibrating conveyor shown in FIG. 1 and around it.

This application is based on the Patent Application No. 2002-327351, filed on Nov. 11, 2002 in Japan, the content of which is incorporated herein, as part thereof.

Also, the invention can be fully understood, referring to the following description in details. Further extensive applications of the invention will be apparent from the following description in details. However, it should be noted that the detailed description and specific examples are preferred embodiments of the invention, only for the purpose of the description thereof. Because it is apparent for the person ordinary skilled in the art to modify and change in a variety of manners, within the scope and spirits of the invention.

The applicant does not intend to dedicate any disclosed embodiments to the public, and to the extent any disclosed modifications or alterations may not literally fall within the scope of the claims, they are considered to be part of the invention under the doctrine of the equivalents.

DESCRIPTION OF THE PREFERRED EMBODIMENTS

Description will be hereinafter made of the embodiments of the present invention with reference to the drawings. The same or corresponding parts are denoted in all figures by the same numerals, and the repetition of the same description will be omitted.

FIG. 1 shows the outline of a vibrating conveyor 1 according to a first embodiment of the present invention. FIG. 1(a) is a plan view of the vibrating conveyor 1 and FIG. 1(b) is a cross-sectional view taken along the line A–A' in FIG. 1(a). The vibrating conveyor 1 is a device for conveying coins using vibration. The vibrating conveyor 1 comprises a conveyor plate 11 on which coins are to be loaded and which conveys the coins loaded thereon by relatively moving the same and a vibrating part 20 as vibration generator means for vibrating the conveyor plate 11. The conveyor plate 11 has a rectangular shape extending in the direction in which the coins are conveyed. "To move coins relatively" herein means, for example, to move coins relatively to a conveyor plate which does not move. That is, it means that the coins move relatively to the conveyor plate. In this embodiment, the vibrating part 20 is attached on the lower side of the conveyor plate 11, in other words, a side opposite the one (which will be hereinafter referred to as upper side as necessary) on which coins are to be loaded. The vibrating part 20 is configured to apply vibration by which the coins loaded on the conveyor plate 11 are conveyed generally in a prescribed direction. The vibration herein is rotational vibration. The coins are herein conveyed to the left in the drawing as shown therein.

The vibrating conveyor 1 has a tray 13 as a coin storage section disposed around the conveyor plate 11 for storing coins to be conveyed by the conveyor plate 11 in conjunction with the conveyor plate 11. In this embodiment, the conveyor plate 11 forms a part of the bottom of the tray 13. The conveyor plate 11 is so disposed that the side on which coins are to be loaded is set horizontally. The tray 13 is configured to be able to receive about 1000 coins. The bottom of the tray 13 has a delivery port 13a in the vicinity of an end of the conveyor plate 11. The delivery port 13a is so shaped that the coins conveyed by the conveyor plate 11 can be dropped therethrough and sent to, for example, an external device.

The conveyor plate 11 is supported at a plurality of points by supporting members. The supporting members are typically elastic members but may be anything which can support the conveyor plate 11 for rotational vibration. Here rotational vibration means one with a circular or an elliptic locus. The elastic members are constituted of compression springs, rubber or the like. In this embodiment, the elastic members are rubbers 15. By using rubber supporting members, the noise caused by vibration of the conveyor plate 11 can be reduced. Also, the vibrating conveyor 1 can be easily downsized as compared with the case in which coil springs, for example, are used as the supporting members. Also, the vibrating conveyor 1 is simple in structure and thus easy to assemble. Description will be hereinafter made based on the premise that the supporting members are rubbers 15. The conveyor plate 11 is attached to the tray 13 via the rubbers 15. The rubbers 15 absorb vibration to be transmitted from the conveyor plate 11 to the tray 13.

Since the conveyor plate 11 is supported at a plurality of points, coins can be loaded on any part of the conveyor plate 11 without causing deviation of a planned plane due to a fluctuation in the load. The number of the points is 4 to 16, for example, preferably 6 to 12, most preferably 8. The planned plane is a plane parallel to a plane formed by the conveyor plate 11 when no coin is loaded thereon. That is, "the planned plane is deviated" means that the conveyor plate 11 is inclined by a fluctuation in the load.

The boundary between the conveyor plate 11 and the tray 13 is formed in a wave shape of a specified period so that coins may not be caught between the conveyor plate 11 and the tray 13. Period means a minimum linear length of a repeated shape measured in the direction of sequence of the wave shape which consists of the repeated shapes.

As shown in the schematic view in FIG. 2, the boundary maybe consists of zigzag lines as shown in FIG. 2(a) or curves (wavy lines) as shown in FIG. 2(b). In this embodiment, the boundary consists of zigzag lines (see FIG. 1). The length of a line segment (segment in the conveying direction, in particular) of the zigzag lines must be smaller than the diameter of coins with the smallest diameter among coins to be conveyed. The length of a line segment is, for example, at most two thirds, preferably at most a half, of the diameter of the coins with the smallest diameter.

The vibrating conveyor 1 is configured to generate vibration at intervals. The control of the vibrating conveyor 1 can be performed by a control part 17 (shown by broken lines in FIG. 1(b)). The control part 17 can be integrated with a master device such as a hereinafter described control part 150 (see FIG. 6) of a coin counting machine 100. By generating vibration at intervals, the vibrating conveyor 1 can convey, for example, a necessary amount of coins. In addition, the vibrating conveyor 1 can convey a necessary amount of coins and drop the coins into the delivery port 13a by generating vibration at intervals. "To generate vibration at intervals" herein means to generate vibration when necessary. That is, the vibrating conveyor 1 generates vibration not continuously but at intervals when necessary.

Referring now to the cross-sectional view in FIG. 3, the conveyor plate 11 and the vibrating part 20 will be described further in detail. FIG. 3 is an enlarged view of the vibrating part 20 in FIG. 1 and around it. The vibrating part 20 has a motor 21 having a rotating shaft 21a and a weight 22 as an eccentric member attached on the rotating shaft 21a. The motor 21 is secured to the conveyor plate 11 with the rotating shaft 21a generally perpendicular to the conveying direction of the conveyor plate 11. As shown in the drawing, the motor 21 is located below the conveyor plate 11 (see FIG. 1). The rotating shaft 21a extends in parallel to the conveyor plate 11. The motor 21 is secured to the conveyor plate 11 via an L-shaped metal plate bracket 23. The weight 22 is a generally rectangular solid shaped metal piece and attached to the rotating shaft 21a at a point offset from its center of gravity. That is, the weight 22 is eccentrically attached to the rotating shaft 21a. The vibrating part 20 generates rotational vibration by rotating the weight 22 with the motor 21. The rotating shaft 21a of the motor 21 is rotated in a direction R1 (counterclockwise) as shown in the drawing to rotate the weight 22 in the direction R1. To convey coins to the right in the drawing, the rotating shaft 21a is rotated in a direction (clockwise) opposite the direction R1.

In this case, the weight 22 can be imaginarily broken down into the following two parts. The first part is an arm which provides rotational balance and is directly connected with the rotating shaft 21a. The second part is a mass which provides rotational unbalance and is connected to the rotating shaft 21a via the arm. The rotating shaft 21a and the arm of the weight 22 functions as a reciprocating member and the mass of the weight 22 functions as a mass member. The rotating shaft 21a and the arm of the weight 22 reciprocatively moves the mass of the weight 22 relatively to the conveyor plate 11.

In place of the motor 21 with the rotating shaft 21a, a magnet device may be provided on the top surface of the tray 13 or on the bottom surface of the conveyor plate 11. The magnetic device, as a reciprocating member, produces a magnetic force to oscillate the tray 13 as a mass member relatively to the conveyor plate 11. In this case, the tray 13 is fixed on the ground, and the tray 13 may be regarded having a very large (or infinite) amount of mass as a mass member. Anyhow, the tray 13 and the conveyor plate 11 are relatively moving. An elastic material such as a rubber or a spring may be provided between the conveyor plate 11 and the tray 13 to produce a reaction force or a resilient force against the magnetic force. To produce conveying movement to the coins, the magnet device may be set inclined to the conveyor plate 11, or a device which converts a reciprocating movement produced by the magnetic force of the magnetic device to a rotational movement may be provided.

Description will be made of the concept of conveying coins using vibration. Here, the vertical direction in the drawing, namely a direction perpendicular to the conveyor plate 11, and the lateral direction in the drawing, namely the conveying direction, are defined as y-axis direction and x-axis direction, respectively. Also, coins are here conveyed to the left in the drawing. When the rotating shaft 21a of the motor 21 is rotated in the direction R1, the weight 22 attached to the rotating shaft 21a is rotated in the direction R1. At this time, rotating vibration is generated in the motor 21 as reaction to the rotation of the weight 22. Also, since the motor 21 is secured to the conveyor plate 11, the rotational vibration of the motor 21 is applied to coins on the conveyor plate 11 as a conveying force in the conveying direction (x-axis positive direction). At this time, the phase of the coins and the phase of the weight 22 are different by 180° from each other.

The following equation (1) can be set up based on the center of gravity.

$$m1 \times r1 = m0 \times r0 \tag{1}$$

Wherein m1 is the sum of the masses of the coins, the conveyor plate 11 and the vibrating part 20, r1 is the oscillation radius of the conveyor plate 11, m0 is the eccentric mass of the weight 22, and r0 is the rotation radius of the eccentric mass m0. As is clear from the above equation (1), the eccentric mass m0 of the weight 22 is proportional to the oscillation radius r1 of the conveyor plate 11, and the oscillation radius r1 is inversely proportional to the mass m1. Thus, when a large amount of coins is loaded on the conveyor plate 11, the oscillation radius r1 (amplitude) is decreased, resulting in a decrease in the force for conveying the coins. This is convenient to control the amount of coins to be conveyed by the conveyor plate 11, and in addition, the amount of coins to be dropped into the delivery port 13a as a result of conveyance, and a necessary amount of coins can be easily dropped through the delivery port 13a irrespective of the amount of coins on the conveyor plate 11.

To apply rotational vibration to the conveyor plate 11, the supporting members must have degree of freedom in at least two directions. In this embodiment, since the supporting members are made of a rubber having degree of freedom in three directions, no problem occurs.

Description will be made of the relation between vibration and noise. The amplitude and acceleration of vibration are given by the following equations:

$$Sx = a \sin \omega t \tag{2}$$

$$Sy = a \cos \omega t \tag{3}$$

$$Ax = -a\omega^2 \sin \omega t \tag{4}$$

$$Ay = -a\omega^2 \cos \omega t \tag{5}$$

The resonance frequency f0 is given by the following equation:

$$f0 = (1/2\pi)(k/m1)^{1/2} \tag{6}$$

Wherein Sx is the displacement in the x-axis direction, Sy is the displacement in the y-axis direction, Ax is the acceleration in the x-axis direction, Ay is the acceleration in the y-axis direction, "a" (=r1) is the amplitude (maximum amplitude), ω is the angular velocity, t is the time, and k is the spring constant.

As is clear from the above equations, to increase the force for conveying coins, either or both of the amplitude "a" and the angular velocity ω of the conveyor plate 11 must be increased. However, to increase the amplitude "a", the permissible amplitude of the rubbers 15 must be large. In other words, the rubbers must be large in size, making downsizing difficult. To increase the angular velocity ω, the rigidity of the conveyor plate must be high so that the conveyor plate 11 can be vibrated evenly. Also, when the angular velocity ω is increased, the noise may be increased because of the loudness characteristics (loudness contour). Thus, in this embodiment, the amplitude "a" is set to about 0.1 to 0.5 mm, preferably about 0.1 to 0.3 mm, and the rotational frequency of the motor 21 is set to about 40 to 150 Hz, preferably about 50 to 100 Hz. Thereby, a relatively large conveying force can be obtained and the noise can be reduced (low noise can be achieved).

The resonance frequency f0 is determined by the spring constant k and the mass m1. That is, the resonance frequency f0 is maximum when there is no coin. When the frequency f is set to a high value, noisy noise may be generated. Thus, the conveyor plate 11 preferably has a relatively large mass. Then, since the resonance frequency f0 can be regulated to a relatively low value, the noise is low when there is no coin on the conveyor plate 11. The rotational frequency f of the motor 21 is dependent on the type of the motor used. To avoid resonance, the frequency f must be different from the resonant frequency f0. In this case, when the frequency f is set to a value which is slightly lower than the resonance frequency f0, the resonance frequency f0 may be decreased until it becomes equal to the frequency f0 when coins are loaded on the conveyor plate 11. Thus, the frequency f is preferably set to a value which is higher than the resonance frequency f0. Especially it should preferably be higher than the resonance frequency f0 when no coins are loaded on the conveyor plate 11.

Description has been made of the case where the vibrating part 20 is constituted of a motor having a rotating shaft. However, the vibrating part 20 may be anything which can generate rotational vibration. For example, a plurality of vibrators for generating vibration in one direction may be used. In this case, two such vibrators are combined to generate vibrations in two directions, and the vibrations are converted in rotational vibration by controlling the phases thereof. When the conveyor plate 11 is inclined in the conveying direction, vibration in one direction is enough. In this case, the vibration must have a component normal to the conveyor plate 11. In other words, when the conveyor plate 11 is inclined in the conveying direction, the vibration generated by the vibrating part 20 must have at least a component normal to the conveyor plate.

Figure 4:
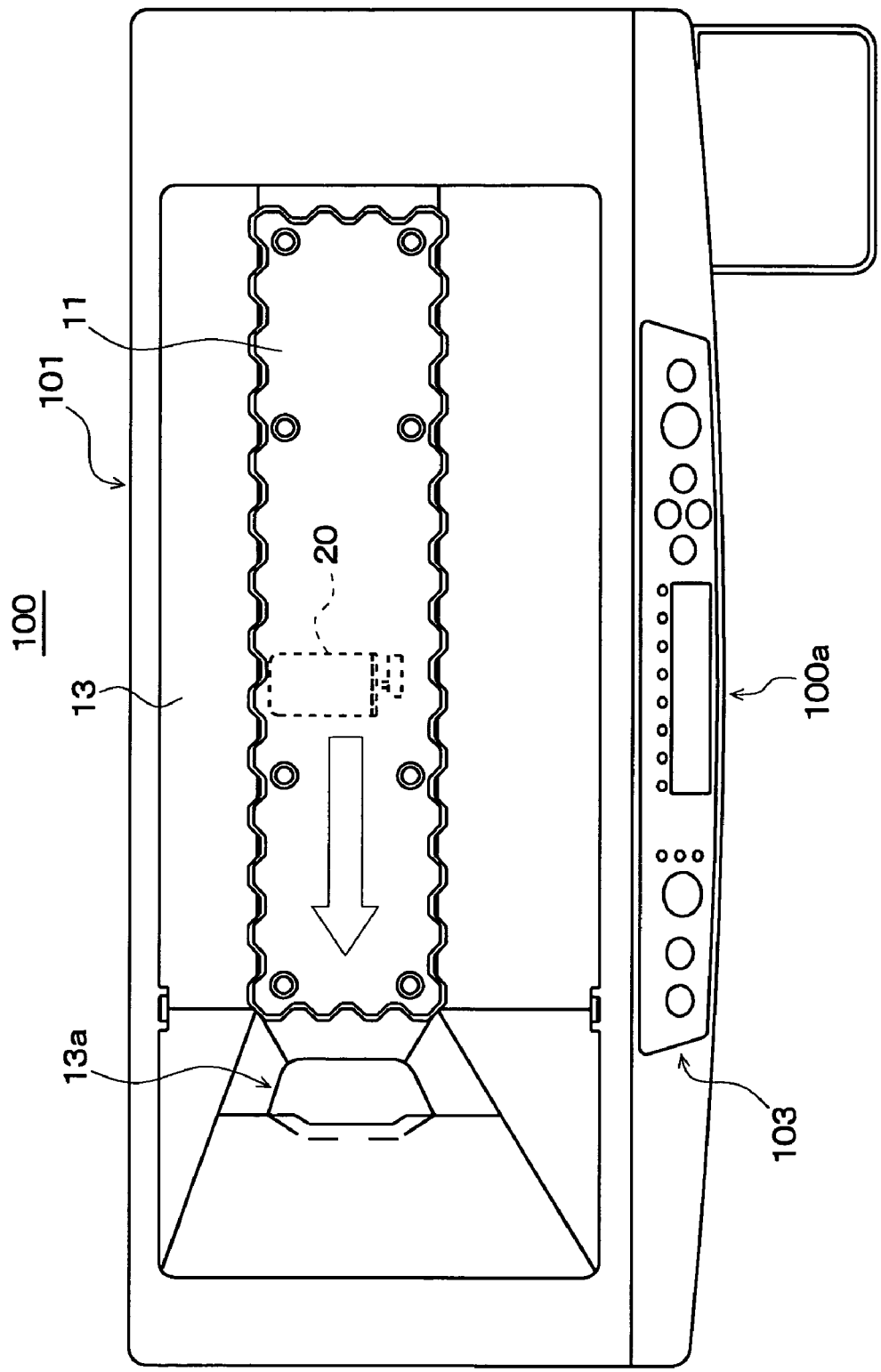
FIG. 4 is a plan view illustrating the external appearance of a coin counting machine according to a second embodiment of the present invention.

Referring now to the plan view in FIG. 4, a coin counting machine 100 as a coin processor device according to a second embodiment of the present invention will be described. The coin counting machine 100 is a device for counting the number of coins. The coin counting machine 100 has a vibrating conveyor 101 as a coin sender, for storing a large amount of coins and sending the large amount of coins at intervals. The vibrating conveyor 101 is also a coin sender for storing a large amount of coins and sending the large amount of coins at intervals while the coins are conveyed. The large amount of coins herein means coins in an amount greater than the amount described below stored in a coin dispenser section 110 (see FIG. 5). The amount of coins which can be stored in the vibrating conveyor 101 here is about 1000. The vibrating conveyor 101 is similar to the vibrating conveyor 1 described in the first embodiment. Since the vibrating conveyor 101 has a constitution which is basically the same as that of the vibrating conveyor 1, each component is designated by the same numeral. The vibrating conveyor 101 is located in an upper part of the coin counting machine 100. The coins are conveyed to the left in the drawing as in the case with the vibrating conveyor 1.

The vibrating conveyor 101 is formed integrally with an upper cover 100a of the coin counting machine 100. The upper cover 100a has an upper surface, and a display and operation part 103 for operating the coin counting machine 100 is located on the front side in the drawing of the upper surface of the upper cover 100a.

Figure 5:
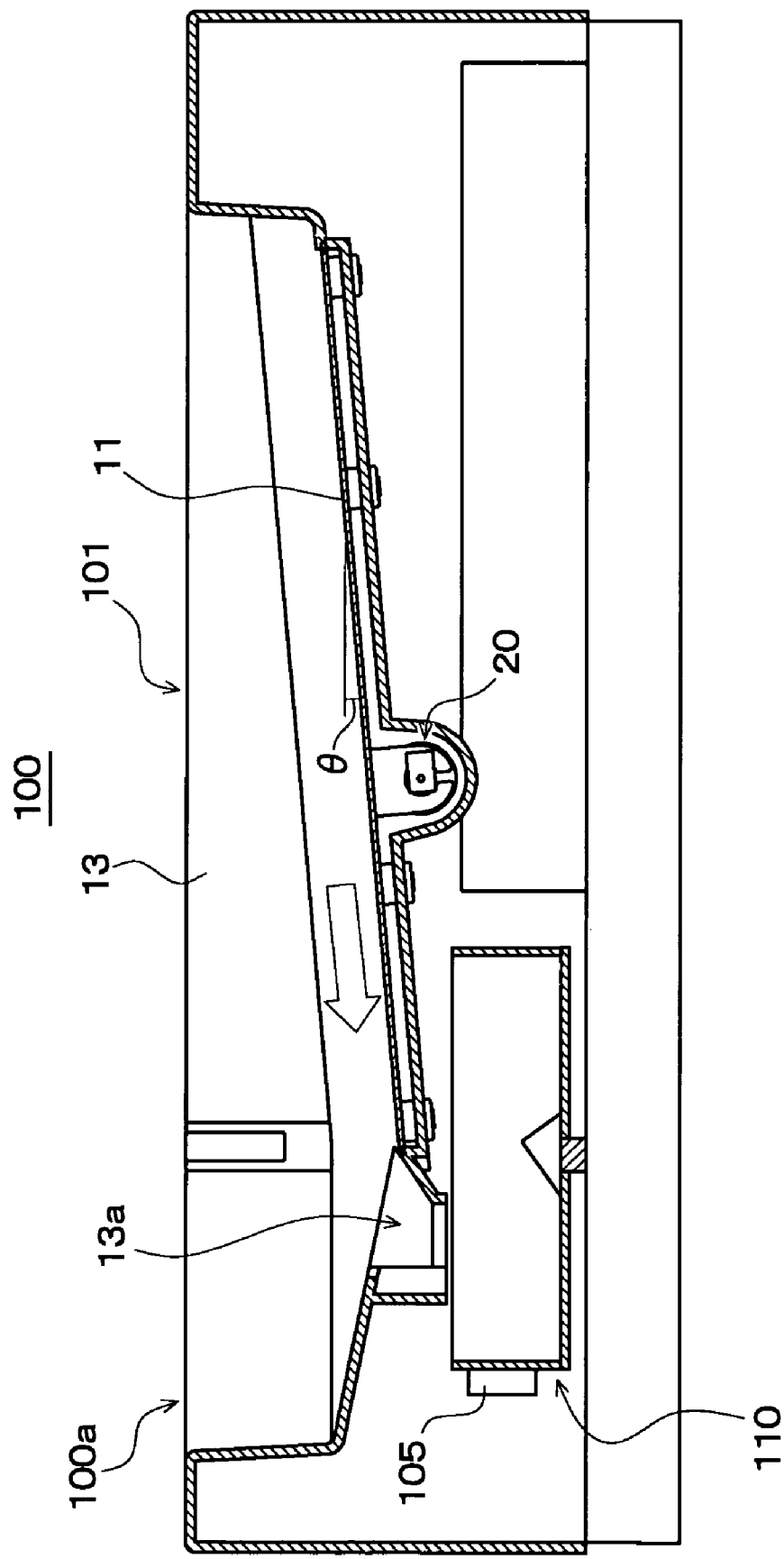
FIG. 5 is a schematic cross-sectional view illustrating the coin counting machine according to the second embodiment of the present invention.

As shown in the cross-sectional view in FIG. 5, the vibrating conveyor 101 has a tray 13 formed integrally with an upper part of the coin counting machine 100. The tray can receive about 1000 coins as described before. The bottom of the tray 13 has a delivery port 13a in the vicinity of an end of the conveyor plate 11. The delivery port 13a is so shaped that the coins conveyed by the conveyor plate 11 can be dropped therethrough and sent to a dispenser section 110 described thereinafter.

In the vibrating conveyor 101, the conveyor plate 11 is slightly inclined in the direction in which coins are conveyed. "To be slightly inclined" means inclined to such an extent that coins on the conveyor plate 11 cannot slide down easily. The conveyor plate is inclined, for example, 1 to 10°, preferably 3 to 8°. The incline angle θ here is 5°. Thereby, the force for conveying coins can be enhanced. When the conveyor plate 11 of the vibrating conveyor 101 is inclined, coins can be conveyed not by rotational vibration but by vibration in a direction perpendicular to the conveyor plate.

Figure 6:
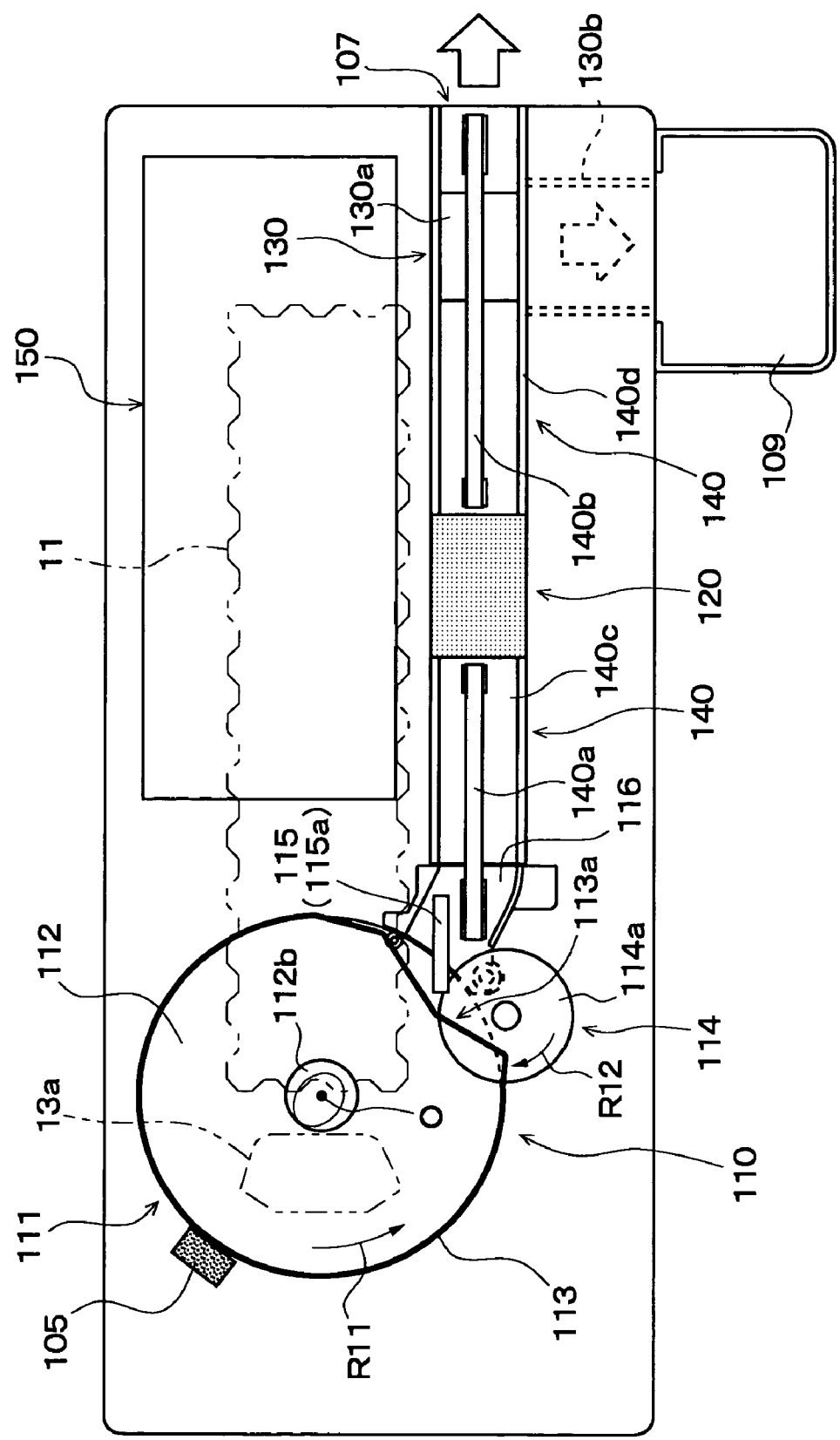
FIG. 6 is a plan view of the coin counting machine shown in FIG. 4 with its upper cover removed.

Referring now to the plan view in FIG. 6, the coin counting machine 100 will be described in more detail. FIG. 6 is a plan view illustrating the state in which the upper cover 100a (the vibrating conveyor 101) has been removed. For understanding of the positional relation, the conveyor plate 11 and the delivery port 13a are shown (by double-dot-dash lines in the drawing).

The coin counting machine 100 has a dispenser section 110 for storing coins sent at intervals by the vibrating conveyor 101 and dispensing the stored coins one at a time, and a discriminating part 120 as a counter section for counting the coins dispensed by the dispenser section 110. The dispenser section 110 has a function of a dispenser for storing a part of coins conveyed by the vibrating conveyor 101 and dispensing the stored coins one at a time. The coin counting machine 100 has a conveyor section 140 for conveying coins dispensed by the dispenser section 110, a sorting part 130 for sorting coins counted by the discriminating part 120, and a discharge port 107 for discharging coins counted by the discriminating part 120, and a control part 150 for controlling the coin counting machine 100. Each of the components will be hereinafter described.

The dispenser section 110 in this embodiment is a rotating disk type. The dispenser section 110 comprises a rotating disk 112 having an upper surface on which coins are to be loaded and rotatable about an axis perpendicular to the upper surface, a peripheral wall member 113 disposed around the rotating disk 112, forming a hopper part 111 for storing coins in conjunction with the rotating plate 112 and having a discharge port 113a which is formed along the upper surface of the rotating disk 112 and through which coins are discharged by rotation of the rotating disk 112. Each of the component parts will be described.

The hopper part 111 comprises the rotating disk 112 as the bottom plate of the hopper and the peripheral wall member 113 disposed on the periphery of the rotating disk 112 in such a manner as to surround the rotating disk 112. The peripheral wall member 113 has a slit-like discharge port 113a which opens along the upper surface of the rotating disk 112. The height of the discharge port 113a is smaller than the thickness of two coins having a smallest thickness among coins handled by the coin counting machine 100, and larger than the thickness of one coin having a largest thickness among the coins to be handled. Thus, a horizontally loaded coin can pass though the discharge port 113a, but a plurality of coins stacked up one another cannot pass through the discharge port 113a. As a result, coins are discharged from the discharge port 113a one at a time.

The rotating disk 112 is rotatable about a center axis O oriented perpendicular to the upper surface of the rotating disk 112. The rotating disk 112 is rotatably driven by a driving part (not shown). The rotating disk 112 is driven to rotate in the direction R11 as shown in the drawing.

In this embodiment, the hopper part 111 can receive about 250 coins. However, the appropriate amount is tens to a hundred of coins. When the hopper part 111 stores coins which exceed its capacity, the rotating disk 112 cannot make necessary rotations and coins cannot be discharged. When a relatively large amount of coins are stored in the hopper part 111, processing efficiency is decreased. Thus, to process a large amount of coins smoothly, an appropriate amount of coins is preferably stored in the hopper part 111.

To the coins put in the hopper part 111, a centrifugal force caused by rotation of the rotating disk 112 is applied in the radial direction of the rotating disk 112. The coins are inclined to move toward the periphery of the rotating disk 112 by the centrifugal force. Preferably, a generally conical-shaped coin guiding protrusion 112b is disposed at the center of the upper surface of the rotating disk 112. Since the centrifugal force exerted on coins in the vicinity of the center of the rotating disk 112 is weak, the coins tend to stay around the center of the rotating disk. Thus, by disposing the generally conical-shaped coin guiding protrusion 112 in the vicinity of the center, it is possible to prevent coins from staying at the place. More preferably, the coin guiding protrusion 112b is shaped like a cone with its top cut off obliquely with respect to the upper surface of the rotating disk 112. Thereby, since the coins stored in the hopper part 111 are stirred, processing efficiency can be improved.

In the close vicinity of the discharge port 113a, the dispenser section 110 has a separating device 114 as separating means for separating coins on the rotating disk 112. The separating device 114 is configured not to act on coins in flat contact with the upper surface of the rotating disk 112 but to separate coins stacked on the coins in flat contact with the upper surface of the rotating disk 112 from the coins in flat contact with the upper surface of the rotating disk 112. "To separate coins" herein means to eliminate stacks of coins, for example. The separating device 114 has a small disk 114a rotatable about an axis perpendicular to the upper surface of the rotating disk 112. The small disk 114a is disposed such that part of it is protruded through a hole formed in the peripheral wall member 113 and located above the rotating disk 112. The small disk 114a is disposed with a gap which is larger than the thickness of a coin and smaller than the thickness of two coins between its lower surface and the upper surface of the rotating disk 112. The small disk 114a is driven to rotate about a vertical axis in a direction of R12 as shown in the drawing by an electric motor (not shown).

In the vicinity of the discharge port 113a, the dispenser section 110 has a dispenser mechanism 115 for dispensing the coins discharged through the discharge port 113a and a passage 116 which is located generally flush with the upper surface of the rotating disk 112 in the vicinity of the discharge port 113a and on which the coins dispensed of the dispenser mechanism 115 are to be moved. The dispenser mechanism 115 and the passage 116 are both located in the vicinity of the discharge port 113a. Each of the component parts will be hereinafter described.

The dispenser mechanism 115 is configured to dispense coins from the rotating plate 112 side to the passage 116 side. The dispenser mechanism 115 has a dispensing roller 115a having an axis parallel to the upper surface of the rotating disk 112. In this embodiment, the dispensing roller 115a is located in the vicinity of the boundary between the passage 116 and the rotating disk 112 with its lower end positioned generally at the center of the passage 116. The dispensing roller 115a is rotatably driven by driving means (not shown). The dispensing roller 115a has a peripheral side which is wide enough to dispense coins. In the dispenser mechanism 115, coins are caught between the passage 116 and the dispensing roller 115a and dispensed.

The passage 116 is located in the vicinity of the discharge port 113a and adjacent to the periphery of the rotating disk 112, in such a position as to be able to receive coins discharged from the rotating disk 112 through the discharge port 113a. In other words, the passage 116 is located in such a position that the dispenser mechanism 115 can dispense coins discharged from the discharge port 113a. The passage 116 has a dimension which allows coins having the largest diameter among coins to be handled with to move thereon. In other words, the passage 116 has a width which allows such coins to pass therethrough.

The dispenser mechanism 115 also serves as means for dispensing coins at predetermined intervals by reducing the speed of coins discharged from the discharge port 113a. In this embodiment, the dispensing speed of the dispenser mechanism 115, in other words, the rotational speed of the dispensing roller 115a is set to a value which is lower than the tangential velocity of rotation of the rotating disk 112. More specifically, the tangential velocity of rotation of the dispensing roller 115a is about a half to a fifth that of the rotating disk 112. In this embodiment, the tangential velocity of rotation of the dispensing roller 115a is about a third that of the rotating disk 112. For example, when the tangential velocity of rotation of the rotating disk 112 is about 1400 mm/s, the tangential velocity of rotation of the dispensing roller 115a is about 430 mm/s. A hereinafter described conveyor section 140 preferably has a conveying speed which is higher than the dispensing speed of the dispenser mechanism 115. Thereby, coins can be supplied with more stability to hereinafter described discriminating part 120 and sorting part 130. "To supply coins with stability" means to supply coins one at a time at predetermined intervals at high speed.

The dispenser section 110 is provided with a coin detecting sensor 105 as coin amount detecting means for detecting the amount of coins stored in the dispenser section 110. The coin detecting sensor 105 is attached to a side of the hopper part 111, in other words, the peripheral wall member 113. The coin detecting sensor 105 is a metal sensor, for example. The coin detecting sensor 105 here detects the amount of coins stored in the hopper part 111.

The discriminating part 120 is disposed on the right side of the dispenser section 110 in the drawing and counts the coins dispensed of the dispenser section 110 one at a time. The discriminating part 120 is configured to discriminate coins to count the number of the coins. The discrimination of coins is, for example, discrimination of types of coins or discrimination between valid coins and invalid coins, namely, discrimination between valid coins and reject coins (coins to be rejected). The discriminating part 120 counts at least the number of valid coins based on the discrimination. Here, the discriminating part 120 counts the number of coins for each type of valid coins. The result of discrimination of coins by the discriminating part 120 is used by the sorting part 130 in sorting the coins.

The conveyor section 140 has a first conveyor belt 140a extending from the dispenser section 110 to the discriminating part 120 and a second conveyor belt 140b extending from the discriminating part 120 to a coin discharge port 107. The conveyor section 140 also has a first conveying passage 140c extending from the dispenser section 110 to the discriminating part 120 and a second conveying passage 140d extending from the discriminating part 120 to the coin discharge port 107. In the conveyor section 140, the first conveyor belt 140a presses coins against the first conveying passage 140c and slidingly conveys the coins. The second conveyor belt 140b and the second conveying passage 140d convey coins in the same manner. The first belt 140a extends to the passage 116 of the dispenser section 110 and can receive coins dispensed one at a time by the dispensing roller 115a.

The sorting part 130 is provided on the second conveying passage 140d and sorts coins based on the result of discrimination by the discriminating part 120. The sorting part 130 has a sorting pawl 130a which is oscillated and drops coins slidingly conveyed on the conveying passage 140d to sort them.

A chute 130b (shown by broken lines in the drawing) is connected to a lower part of the sorting part 130. The chute 130b is connected to a catch pan 109 for storing coins regarded as reject coins by the discriminating part 120, for example. The sorting part 130 can direct reject coins toward the catch pan 109 by oscillating the sorting pawl 130a. Description has been herein made about a case where coins regarded as reject coins by the discriminating part 120 are selected out. The present invention, however, is not limited thereto. For example, the sorting part 120 may be configured to select out valid coins which will not be the objects of counting.

The control part 150 is for controlling the coin counting machine 100 and is integrated with a power supply unit here.

In the coin counting machine 100, the vibrating conveyor 101 is configured to send coins at intervals based on the amount of coins stored in the dispenser section 110. That is, the amount of coins stored in the hopper part 111 of the dispenser section 110 is detected by the coin detecting sensor 105, and the conveyor plate 11 of the vibrating conveyor 101 is configured to deliver coins based on the detected amount of coins. Moreover, the vibrating part 20 of the vibrating conveyor 101 is configured to generate vibration when the detected amount of coins becomes smaller than a predetermined lower limit, for example about 50, and stop vibration when the detected amount of coins becomes larger than a predetermined upper limit, for example about 100. As described above, the vibrating conveyor 101 generates vibration at intervals. As described before, the appropriate amount of coins to be stored in the hopper part 111 of the dispenser section 110 is about tens to a hundred, but the tray 13 of the vibrating conveyor 101 can receive about 1000 coins. Thus, when the conveyor plate 11 of the vibrating conveyor 101 is configured to deliver coins so that the hopper part 111 can receive an appropriate amount of coins, a large amount of coins can be counted smoothly and automatically.

The coin counting machine 100 is configured to calculate the value of the counted coins. The value of the coins can be easily calculated from the types and numbers of the coins discriminated and counted by the discriminating part 120. The coin counting machine 100 may be configured to count a designated number of coins.

Figure 7:
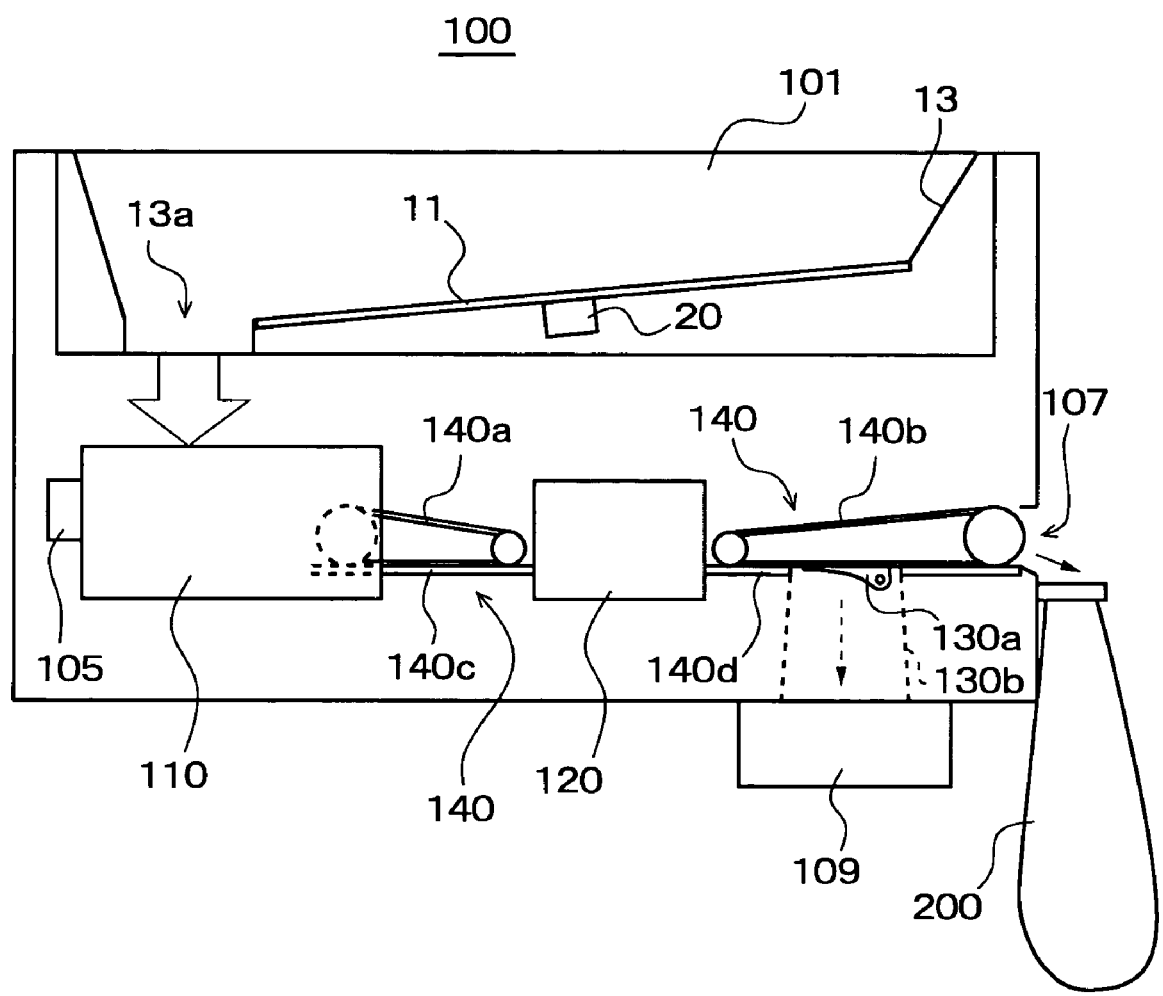
FIG. 7 is a schematic block diagram illustrating an example of operation of the coin counting machine according to the second embodiment of the present invention.

Referring now to the schematic structural view in FIG. 7, an example of operation of the coin counting machine 100 will be described. A user operates the display and operation part 103 (see FIG. 4) to select the types of coins to be counted and loads coins to be counted in the tray 13 (see FIG. 4). Then, the user operates the display and operation part 103 (see FIG. 4) to have the coin counting machine 100 start counting the coins.

The control part 150 (see FIG. 6) of the coin counting machine 100 having an input of an instruction to start counting the coins drives the vibrating part 20 of the vibrating conveyor 101 to have the conveyor plate 11 start conveying coins. Simultaneously, the dispenser section 110 and the conveyor section 140 are driven. Then, the coins loaded in the tray 13 are conveyed by the conveyor plate 11, dropped through the delivery port 13a and sent. The sent coins are stored in the dispenser section 110. When the coin detecting sensor 105 detects that an appropriate amount of coins is stored in the dispenser section 110, the control part 150 stops driving the vibrating part 20 so that the conveyor plate 11 stops conveying coins. The control part 150 has the vibrating conveyor 101 start conveying coins again when the coin detecting sensor 105 detects that the amount of coins in the dispenser section 110 becomes smaller than the appropriate amount. The operation is repeated until no coin remains in the tray 13.

The coins stored in the dispenser section 110 are dispensed by the dispenser section 110 one at a time. The coins dispensed by the dispenser section 110 are slidingly conveyed on the first conveying passage 140c to the discriminating part 120 by the first conveyor belt 140a. Then, the coins are discriminated and counted in the discriminating part 120 and then slidingly conveyed on the second conveying passage 140d by the second conveyor belt 140b. At this time, coins of the type regarded as the objects of counting are slidingly conveyed and discharged through the coin discharge port 107. The discharged coins are stored in a coin collecting bag 200, for example.

The control part 150 oscillates the sorting pawl 130a and drops coins of the type not regarded as the objects of counting by the discriminating part 120, namely coins regarded as reject coins, to the chute 130b to send them to the catch pan 109. The coin counting machine 100 repeats the above operation to count the number of coins loaded on the tray 13 (conveyor plate 11).

As has been described previously, the vibrating conveyor 1 according to the first embodiment comprises the conveyor plate 11 and the vibrating part 20 secured to the conveyor plate 11. Thus, the vibrating conveyor 1 has a very simple structure for handling a relatively large amount of coins.

Also, the vibrating conveyor 1 has a simple structure and thus can be easily downsized. Also, the vibrating conveyor 1 has the tray 13 for storing coins in conjunction with the conveyor plate 11 and thus can receive a large amount of coins easily. In addition, since the boundary between the conveyor plate 11 and the tray 13 is formed in a wave shape of a specified period, coins can be prevented from being caught in the boundary between the conveyor plate 11 and the tray 13.

The vibrating part 20 has the motor 21 having the rotating shaft 21a and the weight 22 attached to the rotating shaft and secured to the conveyor plate 11 with the rotating shaft 21a generally perpendicular to the conveying direction. Thus, the vibrating part 20 can easily generate vibration by which the coins loaded on the conveyor plate 11 are conveyed in the conveying direction. Also, by setting the rotational frequency of the motor 21 to about 50 to 100 Hz, good conveyance performance and low noise can be achieved. In addition, since the coins loaded on the conveyor plate 11 are conveyed by vibrating the conveyor plate 11, the coins can be conveyed whether the amount of coins loaded on the conveyor plate is large or small.

The conveyor plate 11 is supported at a plurality of points by the supporting members. Thus, wherever on the conveyor plate 11 the coins are loaded, the influence of fluctuations in the load is small. Also, since rubber is used for the supporting members, the noise due to vibration of the vibrating plate 11 can be reduced. In addition, the vibrating conveyor 1 can be easily downsized as compared with the case in which coil springs are used as the supporting members. Also, the vibrating conveyor 1 can covey a necessary amount of coins, for example, by generating vibration at intervals.

As has been described previously, the coin counting machine 100 according to the second embodiment has the vibrating conveyor 101. Thus, a large amount of coins can be stored and sent to the dispenser section 110. Also, in the coin counting machine 100, since the vibrating conveyor 101 sends coins at intervals based on the amount of coins stored in the dispenser section 110, an appropriate amount of coins can be stored in the dispenser section 110. Thus, the coin counting machine 100 can process coins with high efficiency. Also, even when there are coins in an amount which is greater than the amount which can be stored in the dispenser section 110, the coins can be stored in the dispenser section 110 in an appropriate amount by the intermittent delivery by the vibrating conveyor 101 and automatically counted with ease.

The coin counting machine 100 can cope with the change of the type of coins to be handled with. For example, when the coins to be handled with are changed from Japanese coins to foreign coins such as Euro coins, the coin counting machine 100 can be used if only the discriminating part and software are changed.

As has been described previously, according to the present invention, a vibrating conveyor for conveying coins using vibration comprises a conveyor plate on which coins are to be loaded and which conveys the coins loaded thereon by relatively moving the same, and vibration generator means for vibrating the conveyor plate. Thus, there can be provided a vibrating conveyor which is simple and capable of dealing with a large amount of coins.

What is claimed is:

1. A vibrating conveyor for conveying coins using vibration, comprising:
   a conveyor plate to be loaded with coins to convey said coins loaded thereon by moving said coins relative to said conveyor plate; and
   a mass member and a reciprocating member reciprocatively moving said mass member, at a frequency of between about 40 to 150 Hz, relative to said conveyor plate for vibrating said conveyor plate so that vibration of said conveyer plate has a component normal to said conveyer plate;
   wherein said vibration has an amplitude of between about 0.1 mm to 0.5 mm.

2. The vibrating conveyor as claimed in claim 1, configured to generate vibration at intervals.

3. The vibrating conveyor as claimed in claim 1, wherein said conveyor plate is supported at a plurality of points by a supporting member.

4. A coin processor device, comprising:
   the vibrating conveyor according to claim 1; and
   a dispenser section for storing a part of coins to be conveyed and dispensing stored coins one at a time.

5. A coin processor device, comprising:
   the vibrating conveyor according to claim 1, for storing an amount of coins and sending said amount of coins at intervals to a dispenser section while said coins are conveyed;
   said dispenser section for storing said coins sent at intervals and dispensing stored coins one at a time; and
   a counter section for counting said dispensed coins;
   wherein said amount of coins is greater than an amount of coins which can be stored in said dispenser section.

6. A coin processor device, comprising:
   the vibrating conveyor according to claim 1, for storing an amount of coins and sending said amount of coins at intervals to a dispenser section;
   said dispenser section for storing said coins sent at intervals and dispensing stored coins one at a time; and
   a counter section for counting dispensed coins;
   wherein said vibrating conveyor sends said coins at intervals based on the amount of coins stored in said dispenser section;
   wherein said amount of coins is greater than an amount of coins which can be stored in said dispenser section.

7. The vibrating conveyer as claimed in claim 1, wherein said vibration is rotational vibration.

8. A vibrating conveyor for conveying coins using vibration, comprising:
   a conveyor plate to be loaded with coins to convey said coins loaded thereon by moving said coins relative to said conveyor plate; and
   a motor with a rotating shaft and an eccentric member attached to said rotating shaft for vibrating said conveyor plate at a frequency between about 40 to 150 Hz;
   wherein said motor is fixed to said conveyor plate so that said rotating shaft is parallel to said conveyer plate and generally perpendicular to the conveying direction and said vibration of said conveyor plate is set to an amplitude of between about 0.1 mm to 0.5 mm.

9. The vibrating conveyor as claimed in claim 8, configured to generate vibration at intervals.

10. The vibrating conveyor as claimed in claim 8, wherein said conveyor plate is supported at a plurality of points by a supporting member.

11. A coin processor device, comprising:
    the vibrating conveyor according to claim 8; and
    a dispenser section for storing a part of coins to be conveyed and dispensing stored coins one at a time.

12. A coin processor device, comprising:
the vibrating conveyor according to claim 8, for storing an amount of coins and sending said amount of coins at intervals to a dispenser section while said coins are conveyed;
said dispenser section for storing said coins sent at intervals and dispensing stored coins one at a time; and
a counter section for counting said dispensed coins;
wherein said amount of coins is greater than an amount of coins which can be stored in said dispenser section.

13. A coin processor device, comprising:
the vibrating conveyor according to claim 8, for storing an amount of coins and sending said amount of coins at intervals to a dispenser section;
said dispenser section for storing said coins sent at intervals and dispensing stored coins one at a time; and
a counter section for counting dispensed coins;
wherein said vibrating conveyor sends said coins at intervals based on the amount of coins stored in said dispenser section;
wherein said amount of coins stored in said vibrating conveyor is greater than an amount of coins which can be stored in said dispenser section.

14. A vibrating conveyor for conveying coins using vibration, comprising:
a conveyor plate to be loaded with coins to convey said coins loaded thereon by moving said coins relative to said conveyor plate;
a vibration generator means for vibrating said conveyor plate; and
a coin storage section disposed around said conveyor plate for storing said coins to be conveyed in conjunction with said conveyor plate;
wherein the boundary between said conveyor plate and said coin storage section is formed in a wave shape of a specified period to avoid catching of said coins between said conveyor plate and said storage section.

15. The vibrating conveyor as claimed in claim 14, configured to generate vibration at intervals.

16. The vibrating conveyor as claimed in claim 14, wherein said conveyor plate is supported at a plurality of points by a supporting member.

17. A coin processor device, comprising:
the vibrating conveyor according to claim 14; and
a dispenser section for storing a part of coins to be conveyed and dispensing stored coins one at a time.

18. A coin processor device, comprising:
the vibrating conveyor according to claim 14, for storing an amount of coins and sending said amount of coins at intervals to a dispenser section while said coins are conveyed;
said dispenser section for storing said coins sent at intervals and dispensing stored coins one at a time; and
a counter section for counting said dispensed coins;
wherein said amount of coins is greater than an amount of coins which can be stored in said dispenser section.

19. A coin processor device, comprising:
the vibrating conveyor according to claim 14, for storing an amount of coins and sending said amount of coins at intervals to a dispenser section;
said dispenser section for storing said coins sent at intervals and dispensing stored coins one at a time; and
a counter section for counting dispensed coins;
wherein said vibrating conveyor sends said coins at intervals based on the amount of coins stored in said dispenser section;
wherein said amount of coins stored in said vibrating conveyor is greater than an amount of coins which can be stored in said dispenser section.

20. A vibrating conveyor for conveying coins using vibration, comprising:
a conveyor plate to be loaded with coins to convey said coins loaded thereon by moving said coins relative to said conveyor plate;
a mass member and a reciprocating member reciprocatively moving said mass member relatively to said conveyor plate for vibrating said conveyor plate; and
a coin storage section disposed around said conveyor plate for storing said coins to be conveyed in conjunction with said conveyor plate;
wherein the boundary between said conveyor plate and said coin storage section is formed in a wave shape of a specified period to avoid catching of said coins between said conveyor plate and said storage section.

21. A coin processor device, comprising:
the vibrating conveyor according to claim 20; and
a dispenser section for storing a part of coins to be conveyed and dispensing stored coins one at a time.

22. The vibrating conveyor as claimed in claim 20, configured to generate vibration at intervals.

23. The vibrating conveyor as claimed in claim 20, wherein said conveyor plate is supported at a plurality of points by a supporting member.

24. A coin processor device, comprising:
the vibrating conveyor according to claim 20, for storing an amount of coins and sending said amount of coins at intervals to a dispenser section while said coins are conveyed;
said dispenser section for storing said coins sent at intervals and dispensing stored coins one at a time; and
a counter section for counting said dispensed coins;
wherein said amount of coins is greater than an amount of coins which can be stored in said dispenser section.

25. A coin processor device, comprising:
the vibrating conveyor according to claim 20, for storing an amount of coins and sending said amount of coins at intervals to said dispenser section;
said dispenser section for storing said coins sent at intervals and dispensing stored coins one at a time; and
a counter section for counting dispensed coins;
wherein said vibrating conveyor sends said coins at intervals based on the amount of coins stored in said dispenser section;
wherein said amount of coins stored in said vibrating conveyor is greater than an amount of coins which can be stored in said dispenser section.

26. A vibrating conveyor for conveying coins using vibration, comprising:
a conveyor plate to be loaded with coins to convey said coins loaded thereon by moving said coins relative to said conveyor plate;
a motor with a rotating shaft and an eccentric member attached to said rotating shaft for vibrating said conveyor plate;
a coin storage section disposed around said conveyor plate for storing said coins to be conveyed in conjunction with said conveyor plate;
wherein said motor is fixed to said conveyor plate so that said rotating shaft is generally perpendicular to the conveying direction; and wherein the boundary between said conveyor plate and said coin storage section is formed in a wave shape of a specified period to avoid catching of said coins between said conveyor plate and said storage section.

27. A coin processor device, comprising:
the vibrating conveyor according to claim 26; and
a dispenser section for storing a part of coins to be conveyed and dispensing stored coins one at a time.

28. The vibrating conveyor as claimed in claim 26, configured to generate vibration at intervals.

29. The vibrating conveyor as claimed in claim 26, wherein said conveyor plate is supported at a plurality of points by a supporting member.

30. A coin processor device, comprising:
the vibrating conveyor according to claim 26, for storing an amount of coins and sending said amount of coins at intervals to a dispenser section while said coins are conveyed;
said dispenser section for storing said coins sent at intervals and dispensing stored coins one at a time; and
a counter section for counting said dispensed coins;
wherein said amount of coins is greater than an amount of coins which can be stored in said dispenser section.

31. A coin processor device, comprising:
the vibrating conveyor according to claim 26, for storing an amount of coins and sending said amount of coins at intervals to a dispenser section;
said dispenser section for storing said coins sent at intervals and dispensing stored coins one at a time; and
a counter section for counting dispensed coins;
wherein said vibrating conveyor sends said coins at intervals based on the amount of coins stored in said dispenser section;
wherein said amount of coins stored in said vibrating conveyor is greater than an amount of coins which can be stored in said dispenser section.

32. A vibrating conveyor for conveying coins using vibration, comprising:
a conveyor plate to be loaded with coins to convey said coins loaded thereon by moving said coins relative to said conveyor plate;
a mass member and a reciprocating member reciprocatively moving said mass member relatively to said conveyor plate for vibrating said conveyor plate so that vibration of said conveyer plate has a component normal to said conveyer plate;
a coin storage section disposed around said conveyor plate for storing said coins to be conveyed in conjunction with said conveyor plate;
wherein the boundary between said conveyor plate and said coin storage section is formed in a wave shape of a specified period to avoid catching of said coins between said conveyor plate and said storage section.

33. A vibrating conveyor for conveying coins using vibration, comprising:
a conveyor plate to be loaded with coins to convey said coins loaded thereon by moving said coins relative to said conveyor plate;
a motor with a rotating shaft and an eccentric member attached to said rotating shaft for vibrating said conveyor plate;
wherein said motor is fixed to said conveyor plate so that said rotating shaft is parallel to said conveyer plate and generally perpendicular to the conveying direction;
a coin storage section disposed around said conveyor plate for storing said coins to be conveyed in conjunction with said conveyor plate;
wherein the boundary between said conveyor plate and said coin storage section is formed in a wave shape of a specified period to avoid catching of said coins between said conveyor plate and said storage section.

* * * * *